Aug. 6, 1929.　　　　H. BREWSTER　　　　1,723,463
COMBINED LICENSE PLATE HOLDER AND SIGNAL
Filed April 17, 1925　　2 Sheets-Sheet 1
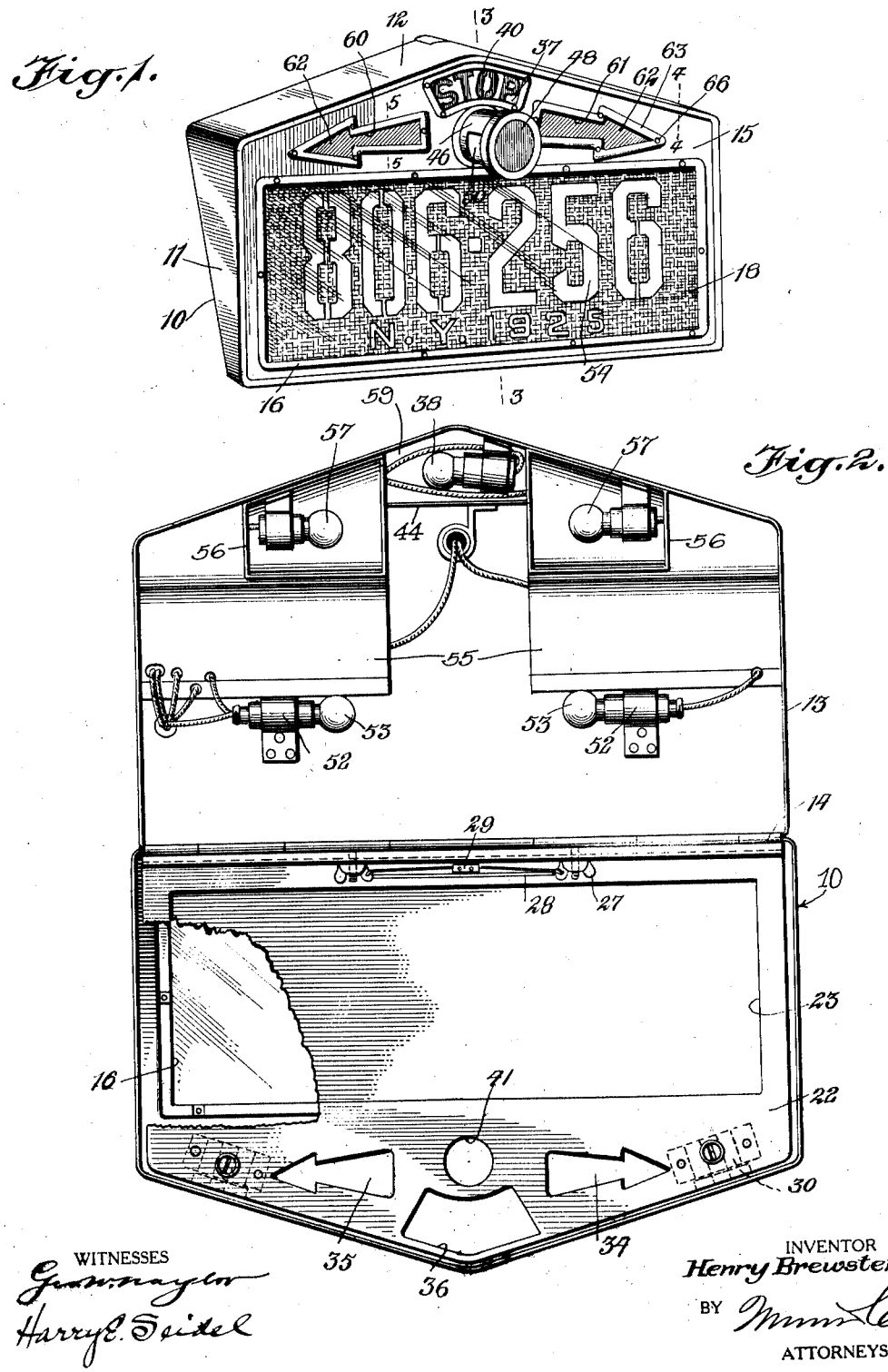
WITNESSES
INVENTOR
Henry Brewster
BY
ATTORNEYS Aug. 6, 1929.  H. BREWSTER  1,723,463
COMBINED LICENSE PLATE HOLDER AND SIGNAL
Filed April 17, 1925   2 Sheets-Sheet 2
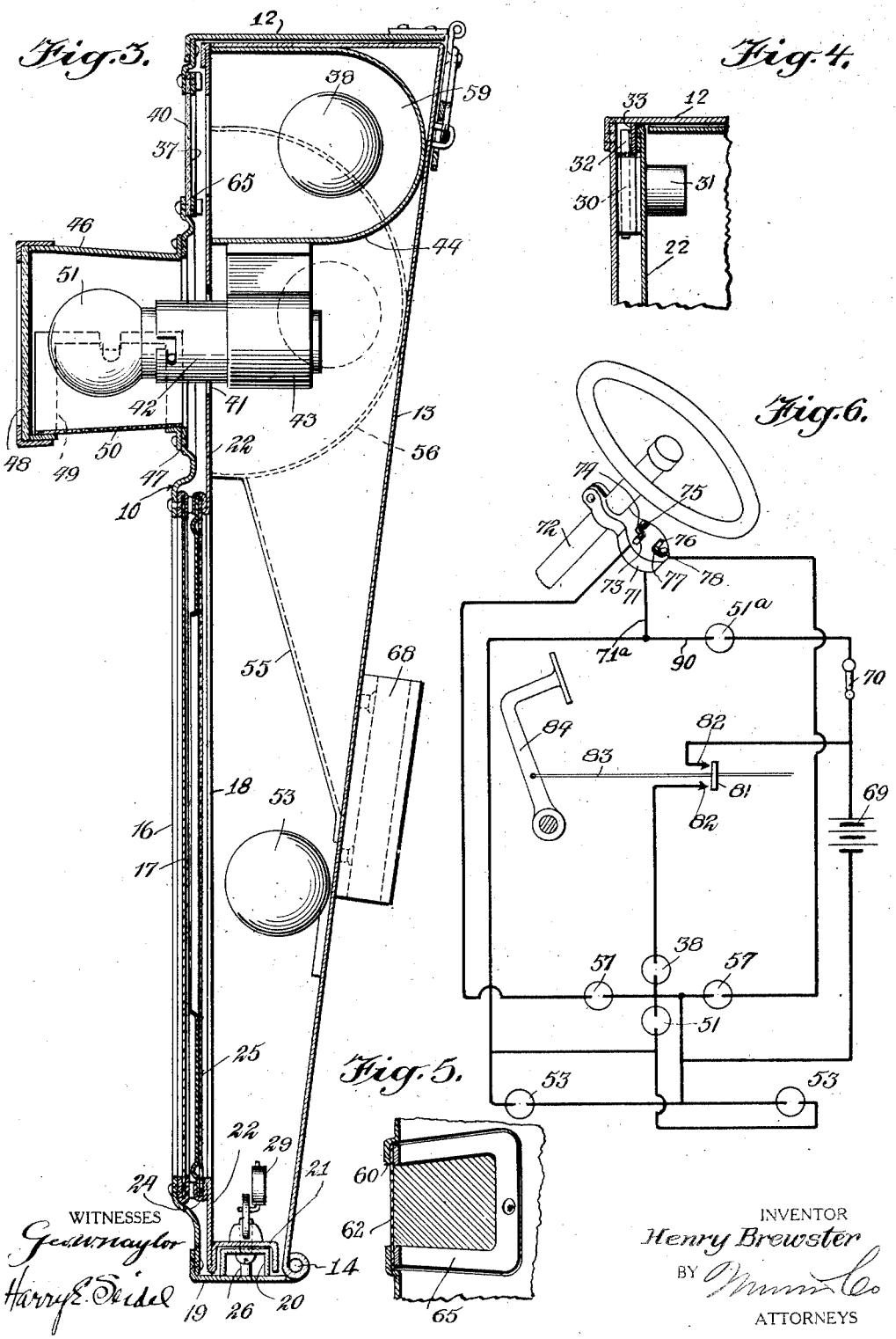
INVENTOR
Henry Brewster
BY
ATTORNEYS Patented Aug. 6, 1929.

1,723,463

UNITED STATES PATENT OFFICE.

HENRY BREWSTER, OF NEW YORK, N. Y.

COMBINED LICENSE-PLATE HOLDER AND SIGNAL.

Application filed April 17, 1925. Serial No. 23,930.

This invention relates to a combined license plate holder and signaling means for an automobile, and has for its object the provision of a device embodying a casing in which a license plate is mounted, locked in position and sealed against unauthorized removal, the casing or rear plate forming a carrying means for a plurality of lamps for illuminating the license plate and for indicating right or left turns in conjunction with a tail light.

A further object of the invention is the provision of a combined license plate holder and a signaling device having a cover having an open face adapted to house a plate or casing carrying a plurality of lamp compartments, in which when the closure is in position the compartments are isolated from each other, the front part of the cover being provided with openings having transparent covering through which the light is transmitted indicating a right or left turn or for indicating stopping of the vehicle to which the license plate holder and signal has been attached.

With the above recited and other objects in view, the invention resides in the novel construction set forth in the following specification, particularly pointed out in the appended claims and illustrated in the accompanying drawings, it being understood that the right is reserved to embodiments other than those actually illustrated herein, to the full extent indicated by the general meaning of the terms in which the claims are expressed.

In the drawings—

Figure 1 is a view in perspective of the combined license plate holder and signaling device;

Figure 2 is a plan view of the license plate holder and signaling device shown in open position;

Figure 3 is a transverse vertical section taken along the line 3—3 of Figure 1;

Figure 4 is a vertical section taken along the line 4—4 of Figure 1 showing a detail of the locking means for preventing unauthorized removal of the license plate;

Figure 5 is a transverse vertical section taken along the line 5—5 of Figure 1 disclosing the construction of the left and right turn indicators; and Figure 6 shows diagrammatically the wiring of the lighting system associated with the casing.

Referring more particularly to the drawings, 10 designates a cover having side walls 11, which gradually decrease in width from the top to the bottom, and a top wall 12, which is formed with two sections inclined upwardly towards the center. A casing generally designated by the numeral 13 is hingedly connected, as shown at 14, to the lower reduced end of the cover 10 and has a shape which is similar in all respects to the shape of the cover 10 but of sufficiently less dimensions so that the casing will neatly fit within the cover 10 and have its side and top walls snugly embraced by the similarly positioned side and top walls of the cover. The front face 15 of the cover 10 is provided with an opening 16 enclosed by a transparent cover 17, through which may be viewed the license plate 18. The bottom 19 of the cover 10 has secured thereon a rib 20 which is adapted to receive a U-shaped flange 21 formed on the bottom of the license plate holder 22. This plate holder has an opening 23 aligning with the opening 16 in the front face of the cover 10 and has the material at the periphery of said opening bent outwardly and upwardly, as shown at 24, to form grooves or receiving flanges for the license plate 25.

Threaded bolts 26 are secured to the bottom 19 of the cover 10 and project through perforations in the rib 20 and are adapted to be received by the perforations in the U-shaped flange 21 and project above said flange sufficiently for the purpose of receiving thumb nuts 27. These nuts are provided with perforations through which is inserted a steel wire 28, and the ends of the wire, as shown at 29, are soldered or welded together to prevent unauthorized removal of the nuts 27. The upper end of the plate holder 22 is provided with a lock 30, a key receiving barrel 31 projecting inwardly and disposed within the cover 10, and a bolt 32 adapted to be received within a keeper 33 formed upon the upper end of the inner wall of the cover 10, so that when the proper key is inserted through the barrel 31 the bolt 32 may be shot into place in the keeper 33 and thereby lock the upper end of the plate holder 22 in position. As shown in Figure 2, there are a pair of locks, one disposed in each corner. Adjacent to each lock is an opening 34 or 35 formed by cutting a section of the material of the plate holder 22 away at this point. A third opening 36 is disposed at the center of the plate holder and is adapted to align with an opening 37 in the face 15 of the cover 10 in order that the light from the lamp 38 may be transmitted through the transparent member 40 which closes the opening 37 in the cover 10 and upon which is printed the indicia "Stop". A fourth opening 41, located below the opening 36, is adapted to permit the insertion of a socket 42 carried by a bracket 43 which is supported from the bottom of an auxiliary lamp casing 44 connected with the casing 13. This opening aligns with an opening 45 formed in the front face 15, which has a barrel or auxiliary casing 46 having a flange 47 secured to the front wall 15 of the cover 10 and embracing the opening 45. A barrel 46 has its outer end open and over which is placed a transparent member 48, usually of red color, for indicating a warning to drivers of other cars when the car to which the casing is applied has been parked. The lower end of the barrel 46 is cut away, as shown at 49, and closed by a transparent member 50 so that the light from the lamp 51 carried by the socket 42 will be directed upon the license plate 25.

At the rear of the plate holder 25 and carried by the casing 13 are a pair of sockets 52 adapted to receive the electric lamps 53 which are adapted to illuminate the license plate, since the license plate, as shown more particularly in Figure 1, has the license number cut out from the material of the plate holder at 54, so that the light from the lamps 53 will be transmitted through said openings and provide a more efficient means for illuminating the license plate. Above the lamps 53, a partition 55 is extended outwardly from the back 13 and terminates in its longitudinal edge at a point where it is adapted to snugly engage the plate holder 22 and thus provide a chamber for the lamps 53 in order to isolate said lamps from the remaining portion of the casing. A second pair of casings 56 are formed above the casing in which the lamps 53 are disposed and are adapted to enclose the lamps 57 which are aligned with the openings 34 and 35 in the plate holder 22. Another compartment 59 is located centrally and above the opening 41 for receiving the lamp 38 which is adapted to provide a lighting means for the stop signal 40.

The outer face 15 of the cover 10 and above the license plate is provided with a pair of openings cut to the shape of an arrow, as shown at 60 and 61. The opening 61 is aligned with the opening 34 in the plate holder 22, while the opening 60 aligns with the opening 35 in said plate holder, and said openings are covered by means of a transparent member 62 and which are received within the beaded portion 63 at the periphery of the openings 60 and 61. After the transparent members 62 are placed in position, metal strips, as shown at 65, are placed at the rear of the transparent members 62 and at their peripheries and riveted, as shown at 66, to the beaded portion 63 at the openings for locking the transparent members in position.

The casing 13 is provided on its rear wall with U-shaped members 68 which are adapted to receive complementarily formed lugs or projections on the automobile whereby the casing is held in position.

Referring more particularly to Figure 6, the circuits to the various lamps are diagrammatically shown and connected with a source of current 69. A manually operated switch closes or opens the circuit to the source of current 69 and to one of the lamps. The lamps 57 are connected in circuit with the battery 69 by means of a manually operated switch disposed within the casing 71. This casing is secured to the steering post 72 and has a slot 73 which has an offset portion 74 in which is movable a switch arm 75. A second slot 76 is provided having an angular disposed portion 77 through which the movable arm 78 of the switch is shifted. When the operator of the car is making a left-hand turn and it is desired to indicate to the public such turn is being made by the signal light 57, it is only necessary to shift the arm 75 to the left for closing the switch to the lamp. When a right-hand turn is to be made, the lever 77 is moved to the right, thereby closing the circuit to another lamp 57 and illuminating the right-hand arrow. The lamps 53 which illuminate the license plate are normally in circuit with the source of current when the switch 70 is closed. The lamp 38 is adapted to be connected in circuit with a source of current by means of a movable contact 81, a pair of contacts 82 adapted to be engaged by the movable contact 81 when the link 83, which is connected to the brake 84, is shifted by the same. The tail light 51 is normally in circuit with the source of current when the switch 70 is closed.

The transparent window or cover 17 is provided for the express purpose of protecting the license plate 25 from rain and dust. The window 17 is set in a frame and the frame is then riveted to the beading at the periphery of the opening 16.

The lamp 51 is adapted to illuminate the license plate 25 through the window 17 so that it will be possible for a policeman to recognize the color of the plate and then determine the State which has granted the license because of its particular color.

The inner surface of the slanting rear wall 13 at its lower end is highly polished and is adapted to act as a reflector for the light from the lamps 53 for sending rays of light through the openings 59 in the license plate. It will also be noted that the highly polished curved surfaces of the casings 56 and 44 also operate as reflectors.

The hinging of the rear section to the front section with the overlapping portions of each section provides a device which will entirely exclude moisture and dirt and maintain the operating elements within the casing in proper working order. Furthermore, the compactness of the casing and the coordination of the working elements in the same provides a unitary structure which may be readily removed when desired containing the complete signaling and lighting structure.

A wire 71$^a$ connects wire 90 with the switch 71 so that when either switch 75 or 76 is operated and placed in circuit with the battery 69, current will be supplied to either lamp 57 as the case may be.

Having thus described my invention, I claim:

1. In a combined signal and license plate holder comprising a casing, a cover housing for the casing, a license plate holder mounted in the cover, a rib on the bottom of the casing, threaded bolts fixed in position and projecting beyond the rib, said holder having a groove to receive the rib and nuts on the bolts for securing the holder to the rib, and means for sealing the nuts against unauthorized removal.

2. In a combined signal and license plate holder, a casing, a cover housing the casing, a license plate holder mounted in the cover, a rib on the cover, threaded bolts fixed in position and projecting beyond the rib, said holder having a groove at one end to receive the rib and nuts on the bolts for securing the holder to the rib, means for sealing the nuts against unauthorized removal, and means at the opposite ends of the holder for locking said end against removal.

3. In a combined signal and license plate holder, a casing, a cover housing the casing, a license plate holder mounted in the cover, a rib on the bottom of the cover, a U-shaped flange at one end of the holder adapted to receive the rib, means for securing the flange to said rib, and means for locking the opposite end of the holder against unauthorized removal.

HENRY BREWSTER.